United States Patent [19]

Ishii et al.

[11] 3,816,150

[45] June 11, 1974

[54] PROCESS FOR MODIFYING CELLULOSE ACETATE

[75] Inventors: Kiyoshi Ishii; Katumi Kojima; Kazuo Ishikawa, all of Iruma, Japan

[73] Assignee: Daicel Ltd., Osaka, Japan

[22] Filed: Dec. 29, 1971

[21] Appl. No.: 213,824

[30] Foreign Application Priority Data
   Dec. 30, 1970   Japan.............................. 45-122233

[52] U.S. Cl.................................. 106/194, 117/63
[51] Int. Cl...C08b 27/44, C08b 27/26, C08b 27/72, C08b 27/30
[58] Field of Search........ 106/194, 196; 264/41, 49; 117/63, 62.2; 260/233.5, 230, 225

[56] References Cited
   UNITED STATES PATENTS
   2,622,997   12/1952   Lulkema.............................. 117/62
   2,705,689   4/1955   Hewson .............................. 260/225
   3,332,794   7/1967   Hart.................................... 106/194
   3,505,312   4/1970   Malm et al.......................... 260/225
   3,669,954   6/1972   Schaeffler............................ 264/49

*Primary Examiner*—Theodore Morris
*Attorney, Agent, or Firm*—Woodhams, Blanchard and Flynn

[57]          ABSTRACT

A process for modifying cellulose acetate by treating an object made of a mixed ester of cellulose and (1) acetic acid and (2) a polybasic carboxylic acid, i.e., a dibasic carboxylic acid and/or tribasic carboxylic acid, with a divalent or higher metal salt to impart solvent resistance to the object.

5 Claims, No Drawings

PROCESS FOR MODIFYING CELLULOSE ACETATE

BACKGROUND OF THE INVENTION

1. Field of the Invention

This invention relates to a process for increasing the solvent resistance of cellulose ester objects.

The ready solubility of cellulose acetate in solvents is an advantage for some purposes, but it is a disadvantage for other purposes. The present invention was specifically devised in order to improve the solvent resistance of cellulose acetate used to make semipermeable membranes for the reverse osmosis process and the following description will be made primarily with reference thereto. The invention is, however, not limited to that particular usage because it is generally effective also as a process for modifying films, fibers and other moldings.

2. Description of the Prior Art

Up to the present, semipermeable membranes having the highest selective permeability for use in the reverse osmosis process have been obtained from cellulose acetate or cellulose acetate butyrate.

However, these prior art semipermeable membranes have the defect that they are quite readily attacked by organic chemicals such as ketones and esters. Said cellulose esters are inferior to three-dimensional high molecular weight molecules in creep resistance, because they are linear high molecular weight molecules. On the other hand, the raw materials and preparation conditions for making semipermeable membranes are highly restricted, because the selective permeability of semipermeable membranes greatly depends on the characteristics of the raw materials and the preparation conditions. Therefore, it has been considered to be difficult to overcome the above defect without at the same time damaging the selective permeability of the semipermeable membranes.

SUMMARY OF THE INVENTION

After intensive investigations, we have discovered that solvent resistance can be imparted to semipermeable membranes without any reduction of the selective permeability of the semipermeable membrane, by preparing a semipermeable membrane of excellent permeability from a mixed ester of cellulose and (1) acetic acid (2) a dibasic carboxylic acid, such as maleic acid, succinic acid or phthalic acid, and/or a tribasic acid, such as trimellitic acid, as the raw materials for making the semipermeable membrane and then subjecting the membrane to treatment with an aqueous solution of a divalent or polyvalent metal salt, such as copper acetate, calcium chloride or zirconium carbonate.

For obtaining a mixed ester of cellulose to be used as the raw material for making the semipermeable membrane, according to the present invention, a continuous one-step process is preferred wherein mixed esterification is effected simultaneously with the acetylation of cellulose. An alternate, two-step process may also be employed in which solid cellulose acetate flakes are prepared initially and they are then mixesterified. In this specification, the following illustrative examples were carried out according to the latter process for convenience' sake, but it is evident that the former process can be employed similarly. In the two-step process, the cellulose acetate must be converted into the form of a solution in order to obtain a homogeneous mixed ester. In this connection, a solvent can be used for dissolving the cellulose acetate and the solvent must have a boiling point higher than the mixed esterification reaction temperature. Generally, cyclic ethers, cyclic ketones and dimethylformamide are preferred solvents. If maleic anhydride or succinic anhydride is used as the polybasic carboxylic acid to be mix-esterified, uniform mix-esterification can be effected without the use of any solvent, because cellulose acetate fiber dissolves in molten maleic anhydride or succinic anhydride at a temperature below the reaction temperature.

The degree of substitution (acetyl for hydroxyl) of the cellulose acetate before the mixed-esterification takes place is preferably above 2.1, particularly above 2.3. The polybasic carboxylic acids to be mix-esterified are used in the form of their anhydrides. The amount of the polybasic carboxylic acids to be charged into the reaction system is preferably in the range of 0.5 to 10 molar equivalents, based on hydroxyl groups remaining in the cellulose acetate. The reaction may be performed either in the presence or in the absence of a catalyst. In respect to the selective permeability of the semipermeable membranes, it is preferred to carry out the reaction at a slightly higher temperature in the absence of catalyst for obtaining excellent results. The preferred degree of polybasic carboxylic acid substitution (for hydroxyl) of the resulting mixed ester of cellulose is above 0.05, particularly above 0.15. The preferred total degree of substitution is above 2.3, particularly above 2.4.

The thus obtained mixed ester of cellulose, before it is treated with a divalent or higher metal salt, is, like cellulose acetate, soluble in various solvents and solutions thereof can be formed into films or fibers and, also, the solution can be mixed with a plasticizer and then can be subjected to fusion molding such as extrusion molding or injection molding. The thus-shaped films, fibers and other moldings can be treated with a divalent or higher metal salt to increase their solvent resistance. This treatment is effected usually by immersing the moldings in an aqueous solution of a concentration of said salt of above 5 weight percent, preferably a saturated aqueous solution of said metal salt, to impregnate the moldings with the metal salt, thereby imparting to them the desired solvent resistance. This treatment can be performed at room temperature and heating of the aqueous solution is not required.

From the thus prepared mixed cellulose ester, a semipermeable membrane having a selective permeability which is closely comparable with the best selective permeability of presently known cellulose acetate membranes can be prepared according to a known method (for example, Japanese Pat. Publication No. 2818/1967 or Office of Saline Water, R & D. Progress Report No. 434, U.S.A.).

The present invention will be further described by means of illustrative Examples of the preparation of semipermeable membranes.

EXAMPLE 1

Forty-four (44) grams of cellulose acetate having a degree of substitution of 2.40 were dissolved in 300 g. of dimethylformamide dried with KOH. In the resulting solution, 19.6 g. of maleic anhydride were dissolved and the whole was allowed to react at 145° C. for two hours in the absence of any catalyst. After completion of the reaction, 200 ml. of acetone were added and the whole was poured into methanol and stirred to form precipitates. The precipitates were washed with water, dried and purified by means of reprecipitation to obtain 41 g. of cellulose acetate maleate having a total degree of substitution of 2.55 and a degree of maleic acid substitution of 0.16. Twenty (20) grams of the thus obtained cellulose acetate maleate were dissolved in 48 g. of acetone and 32 g. of formamide. The solution was cast as a film of a thickness of 0.25 mm. onto a smooth glass plate. After allowing same to stand for 30 seconds, the whole was immersed in cold water of below 1°C. for one hour and then heat treated at 76°C. for 14 minutes. Samples were cut off from the resulting semipermeable membrane, immersed in a saturated aqueous solution of a metal salt, as listed below, for one hour and washed with water. The demineralization capacity and permeability of the samples were measured by circulating therethrough a 3500 ppm. aqueous solution of common salt (NaCl) under 40 atms. pressure. Another part of each of the samples was immersed in acetone for 48 hours to determine its insolubility in acetone. The results were as shown in Table 1.

Table 1

| Metal salt used to treat film | Degree of demineralization (%) | Permeability (m/day) | Matter insoluble in acetone (%) |
| --- | --- | --- | --- |
| NaCl | 86 | 1.4 | 0 |
| KCl | 90 | 1.2 | 0 |
| $CaCl_2$ | 89 | 1.5 | 73 |
| $CuAc_2 \cdot CuO \cdot 6H_2O$ (**) | 90 | 1.3 | 77 |
| $3ZrO_2 \cdot CO_2 \cdot H_2O$ | 85 | 1.6 | 68 |
| Control (*) | 90 | 1.2 | 0 |

(*) A semipermeable membrane prepared from cellulose acetate having a degree of substitution of 2.44 in the same manner as above was used as the control.
(**) Ac indicates acetyl radical.

As shown in Table 1, a semipermeable membrane treated with a monovalent metal salt dissolves completely in acetone. Likewise a semipermeable membrane prepared from cellulose diacetate. A semipermeable membrane treated with a divalent or higher metal salt keeps its original shape, although it is slightly swollen. Thus, a remarkable increase in the solvent resistance is apparent.

EXAMPLE 2

By using cyclohexanone in place of dimethylformamide used in Example 1, 42 g. of cellulose acetate maleate of a total degree of substitution of 2.44 and a degree of maleic acid substitution of 0.09 were obtained. In 25 g. of the product, 45 g. of acetone and 30 g. of formamide were added to obtain 100 g. of the solution. Semipermeable membranes were prepared and treated with metal salt solutions in the same manner as in Example 1 and the properties thereof were measured. The results were as shown in Table 2.

Table 2

| Metal salt used to treat film | Degree of demineralization (%) | Permeability (m/day) | Matter insoluble in acetone (%) |
| --- | --- | --- | --- |
| $CaCl_2$ | 86 | 1.16 | 63 |
| $CuAc_2 \cdot CuO \cdot 6H_2O$ | 91 | 0.95 | 69 |
| Control (no mixed-esterification or salt treatment) | 89 | 1.11 | 0 |

EXAMPLE 3

In 200 g. of dioxane, 44 g. of cellulose acetate having a degree of substitution of 2.44 and 9.8 g. of maleic anhydride were dissolved. The whole was allowed to react at 95°C. for 9 hours to obtain 42 g. of cellulose acetate maleate having a total degree of substitution of 2.52 and a degree of maleic acid substitution of 0.32. Semipermeable membranes were prepared and treated with metal salt solution in the same manner as in Example 2 and the properties thereof were measured. The results were as shown in Table 3.

Table 3

| Metal salt used to treat film | Degree of demineralization (%) | Permeability (m/day) | Matter insoluble in acetone (%) |
| --- | --- | --- | --- |
| $CaCl_2$ | 87 | 1.00 | 92 |
| $CuAc_2 \cdot CuO \cdot 6H_2O$ | 89 | 0.96 | 95 |
| Control (no mixed-esterification or salt treatment) | 92 | 0.97 | 0 |

EXAMPLE 4

In 350 g. of dimethylformamide, 44 g. of cellulose acetate having a degree of substitution of 2.44 and 19.2 g. of trimellitic anhydride were dissolved. The whole was allowed to react at 143°C. for 2 hours to obtain 41 g. of cellulose acetate trimellitate having a total degree of substitution of 2.54 and a degree of trimellitic acid substitution of 0.10. Semipermeable membranes were prepared and treated with metal salt solution in the same manner as in Example 1 and the properties thereof were measured. The results were as shown in Table 4.

Table 4

| Metal salt used to treat film | Degree of demineralization (%) | Permeability (m/day) | Matter insoluble in acetone (%) |
| --- | --- | --- | --- |
| $CaCl_2$ | 92.4 | 0.91 | 87 |
| $CuAc_2 \cdot CuO \cdot 6H_2O$ | 95.0 | 0.90 | 91 |
| Control (no mixed-esterification or salt treatment) | 94.0 | 0.96 | 0 |

EXAMPLE 5

One hundred (100) grams of fine powder of cellulose acetate having a degree of substitution of 2.16 were thoroughly mixed with 133 g. of fine powder of maleic anhydride. The temperature was elevated slowly to 150°C. over a period of two hours and the mixture was kept at this temperature for 10 minutes to complete the reaction. The mixture became a homogeneous solution at a temperature around 90°C. Thus 39 g. of cellulose acetate maleate having a total degree of substitution of 2.57 and a degree of maleic acid substitution of 0.43 were obtained. Semipermeable membranes were prepared in the same manner as in Example 2. Ths solubility in acetone was measured after immersion of the membranes in 10 percent aqueous solution of various polyhydric metal salts for 24 hours. The results were as shown in Table 5.

Table 5

| Metal salt | Matter insoluble in acetone (%) |
|---|---|
| MgAc$_2$·4H$_2$O | 100 |
| Al(OH)·Ac$_2$ | 91 |
| CaAc$_2$·H$_2$O | 101 |
| Cr$_2$(SO$_4$)$_3$·15H$_2$O | 31 |
| MnAc$_2$·4H$_2$O | 100 |
| Fe(OH)Ac$_2$ | 90 |
| Co(NO$_3$)$_2$·6H$_2$O | 54 |
| NiAc$_2$·4H$_2$O | 100 |
| CuAc$_2$·CuO·6H$_2$O | 101 |
| CuCl$_2$·2H$_2$O | 70 |
| Cu(NO$_3$)$_2$·3H$_2$O | 76 |
| CuAc$_2$·H$_2$O | 100 |
| CuSO$_4$·5H$_2$O | 25 |
| ZnAc$_2$·2H$_2$O | 96 |
| CdAc$_2$·2H$_2$O | 48 |
| Control (no mixed-esterification or salt treatment) | 0 |

EXAMPLE 6

In 300 g. of dimethylformamide, 44 g. of cellulose acetate of a degree of substitution of 2.18 and 12.7 g. of maleic anhydride were dissolved. The whole was allowed to react at 145°C. for 2 hours to obtain 42 g. of cellulose acetate maleate having a total degree of substitution of 2.24 and a degree of maleic acid substitution of 0.07. Semipermeable membranes were prepared and treated with aqueous metal salt solutions in the same manner as in Example 1 and the properties thereof were measured. The results were as shown in Table 6.

Table 6

| Metal salt used to treat film | Degree of demineralization (%) | Permeability (m/day) | Matter insoluble in acetone (%) |
|---|---|---|---|
| CaCl$_2$ | 80 | 0.79 | 32 |
| CuAc$_2$·CuO·6H$_2$O | 86 | 0.58 | 88 |
| Control (no mixed-esterification or metal salt treatment) | 91.8 | 0.94 | 0 |

EXAMPLE 7

In 350 g. of dimethylformamide, 44 g. of cellulose acetate having a degree of substitution of 2.44 and 14.9 g. of phthalic anhydride were dissolved. The whole was allowed to react at 142°C. for two hours to obtain 42 g. of cellulose acetate phthalate. Semipermeable membranes were prepared and treated with aqueous metal salt solutions in the same manner as in Example 1 and the properties thereof were measured. The results were as shown in Table 7.

Table 7

| Metal salt used to treat film | Degree of demineralization (%) | Permeability (m/day) | Matter insoluble in acetate (%) |
|---|---|---|---|
| CaCl$_2$ | 92.4 | 0.95 | 75 |
| CuAc$_2$·CuO·6H$_2$O | 94.3 | 0.90 | 70 |
| Control (no mixed-esterification or metal salt treatment) | 94.8 | 0.90 | 0 |

The embodiments of the invention in which an exclusive property or privilege is claimed are defined as follows:

1. A process for making modified cellulose acetate objects of improved solvent resistance which comprises:
   forming or molding mixed cellulose ester made by esterifying (a) cellulose with (b) acetic acid and (c) polybasic carboxylic acid selected from the group consisting of maleic acid, succinic acid, phthalic acid, trimellitic acid and mixtures thereof, to make a formed or molded product, and
   treating the formed or molded product with a liquid treating agent consisting essentially of an aqueous solution of a watersoluble polyvalent metal salt selected from the group consisting of CaCl$_2$, CuAc$_2$·CuO·6H$_2$O, 3ZrO$_2$·CO$_2$·H$_2$O, MgAc$_2$·4H$_2$O, Al(OH)·Ac$_2$, CaAc$_2$·H$_2$O, Cr$_2$(SO$_4$)$_3$·15H$_2$O, MnAc$_2$·4H$_2$O, Co(NO$_3$)$_2$·6H$_2$O, NiAc$_2$·4H$_2$O, Cucl$_2$·2H$_2$O, Cu(NO$_3$)$_2$·3H$_2$O, CuAc$_2$·H$_2$O, CuSO$_4$·5H$_2$O, ZnAc$_2$·2H$_2$O and CdAc$_2$·2H$_2$O, wherein Ac is acetyl.

2. A process according to claim 1, in which the degree of substitution of the hydroxyl groups of cellulose by acetate groups is at least 2.1 and the degree of substitution of the hydroxyl groups of cellulose by polybasic carboxylic acid groups is at least 0.05 and the total degree of substitution of the hydroxyl groups of cellulose is at least 2.3.

3. A process according to claim 1, in which the degree of substitution of the hydroxyl groups of cellulose by acetate groups is at least 2.3 and the degree of substitution of the hydroxyl groups of cellulose by polybasic carboxylic acid groups is at least 0.15 and the total degree of substitution of the hydroxyl groups of cellulose is at least 2.4.

4. A process according to claim 1, in which the metal salt is selected from the group consisting of copper acetate, calcium chloride and zirconium carbonate.

5. A semipermeable membrane prepared by the process of claim 1.

* * * * *